United States Patent
Ishidoshiro

(10) Patent No.: US 7,289,631 B2
(45) Date of Patent: Oct. 30, 2007

(54) ENCRYPTION KEY SETTING SYSTEM, ACCESS POINT, ENCRYPTION KEY SETTING METHOD, AND AUTHENTICATION CODE SETTING SYSTEM

(75) Inventor: Takashi Ishidoshiro, Nagoya (JP)

(73) Assignee: Buffalo Inc., Nagoya (JP)

( * ) Notice: Subject to any disclaimer, the term of this patent is extended or adjusted under 35 U.S.C. 154(b) by 849 days.

(21) Appl. No.: 10/615,286

(22) Filed: Jul. 7, 2003

(65) Prior Publication Data
US 2004/0076300 A1  Apr. 22, 2004

Related U.S. Application Data

(60) Provisional application No. 60/419,488, filed on Oct. 18, 2002.

(30) Foreign Application Priority Data
Dec. 19, 2002  (JP) .............................. 2002-367460

(51) Int. Cl.
*H04L 9/00* (2006.01)
(52) U.S. Cl. .................................................... 380/270
(58) Field of Classification Search ................ 726/21, 726/28, 29, 30; 380/270
See application file for complete search history.

(56) References Cited

U.S. PATENT DOCUMENTS

| | | | |
|---|---|---|---|
| 4,686,529 A | | 8/1987 | Kleefeldt |
| 5,365,225 A | | 11/1994 | Bachhuber |
| 6,148,205 A | * | 11/2000 | Cotton .................... 455/435.1 |
| 6,169,803 B1 | * | 1/2001 | Sako et al. ................... 380/44 |
| 2001/0048744 A1 | | 12/2001 | Kimura ...................... 380/247 |
| 2002/0115426 A1 | * | 8/2002 | Olson et al. ................ 455/410 |
| 2003/0048905 A1 | * | 3/2003 | Gehring et al. ............. 380/270 |
| 2004/0168081 A1 | * | 8/2004 | Ladas et al. ................ 713/201 |
| 2005/0201557 A1 | * | 9/2005 | Ishidoshiro .................. 380/44 |

FOREIGN PATENT DOCUMENTS

| | | |
|---|---|---|
| EP | 0986020 A | 3/2000 |
| JP | 4-505193 | 9/1992 |
| JP | 6-178372 | 6/1994 |
| JP | 2000164519 | 12/2001 |
| WO | WO02062024 | 8/2000 |

OTHER PUBLICATIONS

"A Method to Safely Distribute an Encryption Key (WEP Key) to Authorized Person/System", International Business Machines, Research Disclosure, Mar. 2002, 1 page.

* cited by examiner

Primary Examiner—Matthew B Smithers
(74) Attorney, Agent, or Firm—Beyer Weaver LLP

(57) ABSTRACT

In an encryption key setting system of the present invention, in response to an operation of a registration button 127, an access point 20 restricts the coverage of radio wave transmitted from the access point 20 from a general radio communication area AR1 to a narrower security communication area MR1. The access point 20 subsequently delivers a WEP key to a terminal 50, confirms the successful delivery, and registers a MAC address of the terminal 50. The terminal 50 sets the delivered WEP key in itself. This arrangement desirably allows for new enrollment of a terminal for a wireless LAN by a simple method, while effectively preventing leakage of data representing an encryption key.

9 Claims, 5 Drawing Sheets

ENCRYPTION KEY SETTING SYSTEM, ACCESS POINT, ENCRYPTION KEY SETTING METHOD, AND AUTHENTICATION CODE SETTING SYSTEM

This application claims priority of U.S. Provisional Patent Application No. 60/419,488, filed Oct. 18, 2002 entitled "Wireless Lan System, " which is hereby incorporated by reference.

BACKGROUND OF THE INVENTION

1. Field of the Invention

The present invention relates to a technique of setting an encryption key, which is used to encrypt radio communication data transmitted between an access point as a relay station for a wireless LAN and a terminal equipped with a device for connecting with the wireless LAN prior to the transmission, in the terminal and in the access point.

2. Description of the Related Art

Access points as radio relay stations for a wireless LAN are used as the device of connecting multiple computers at separate locations to the Internet not only in the places where specific people continuously act; such as homes and offices (hereafter referred to as private spaces), but in the places where general public temporarily act, such as hotels, airports, shopping malls, parks, and stations (hereafter referred to as public spaces) One proposed technique connects an access point located in a public space with a broadband line, which ensures high-speed Internet access service, such as an xDSL line or a CATV line, and gives a space for Internet access (hereafter referred to as a free spot) to the general public in the coverage of radio wave transmitted from the access point (radio communication area). The administrator of the public space is authorized to use a certain broadband line. The broadband line is open to terminals possessed by the respective users of the public space via the access point for the wireless LAN. This enhances the convenience of the user's Internet access and increases the utilization rate of the public space.

The free space may give only limited people (for example, clients) the authorization for access to the Internet via the wireless LAN in the radio communication area. In such cases, it is required to prevent illegal access of any unauthorized person to the network. A number of people use the same free spot, and the radio waves for wireless communication are frequently transmitted between terminals possessed by the respective people and the access point. For sufficient protection of privacy of each person, it is essential to effectively prevent the contents of communication from being leaked to any third person by interception of the radio waves in the radio communication area.

Diverse security techniques for preventing illegal access to the network and leakage of communication to any third person have been proposed with regard to the wireless LAN. One proposed technique utilizes a MAC (Media Access Control) address, which is an intrinsic identification number allocated to a device for connecting the wireless LAN (for example, a wireless LAN adapter) attached to the terminal, and registers the allocated MAC address in the access point. The access point authenticates the MAC address in response to an access from the terminal, and rejects the request of access to the network from the terminal when the input MAC address is not identical with the registered MAC address. This technique is referred to as the MAC address restriction technique (for example, see Japanese Patent Laid-Open Gazette No. 2001-320373). Another proposed technique sets a WEP (Wired Equivalent Privacy) key as a common encryption key in both the terminal and the access point and encrypts the details of the data, which are transmitted between the terminal and the access point, with the WEP key. Even in the case of accidental leakage of data, the encryption makes it difficult to analyze and grasp the data. This technique is referred to as the WEP encryption technique (for example, see Japanese Patent Laid-Open Gazette No. 2001-345819).

In order to ensure the high security level of the free spot, each user who wants to utilize the free spot is required to register the MAC address and set the WEP key with regard to the terminal of the user, prior to use of the free spot.

The prior art security technique, however, requires manual registration of the MAC address in the access point and manual setting of the WEP key in the terminal, and is rather troublesome and inconvenient in the case of new enrollment of a terminal for the wireless LAN. Especially in the case of a free spot installed in a public space, there are a large number of users who want to utilize the free spot, and the number is increasing. It is extremely inconvenient and unpractical to ask each of the many users who possess own terminals to operate the terminal for registration of the MAC address and setting of the WEP key as the conditions of utilizing the free spot.

The WEP key of an arbitrary letter string set in the terminal should also be set in the access point. It is preferable to utilize the wireless LAN for the setting. The WEP key data carried on the radio wave is transmitted from the terminal to the access point by wireless. The access point receives the transmitted WEP key and sets the WEP key mapped to the terminal. The user of the terminal is then allowed to enjoy various services (for example, Internet access service) via the wireless LAN immediately after transmission of the WEP key. In the case of wireless transmission of the WEP key, however, there is a possibility of leakage of the WEP key to a third person through interception of the radio wave transmitted between the terminal and the access point. The third person who illegally obtains the leaked WEP key can analyze and grasp all the data transmitted between the access point and the terminal with the WEP key. This disables the security system based on encryption. Especially in the access point of the free spot, the WEP key is set in the terminals of many users who want to utilize the free spot. It is thus highly demanded to effectively prevent leakage of the WEP key and ensure sufficient secrecy of communication for a large number of users.

SUMMARY OF THE INVENTION

The object of the present invention is thus to allow for new enrollment of a terminal for a wireless LAN by a simple method, while effectively preventing leakage of data representing an encryption key.

In order to attain at least part of the above and the other related objects, the present invention is directed to an encryption key setting system that sets an encryption key, which is used to encrypt radio communication data transmitted between an access point as a relay station for a wireless LAN and a terminal equipped with a device for connecting with the wireless LAN prior to the transmission, in the terminal. The encryption key setting system includes: a communication range restriction module that restricts a radio communication range between the access point and the terminal to be narrower than a general communication range; and an encryption key setting module that, while the radio communication range is restricted by the communication range restriction module, transmits encryption key data representing the encryption key by wireless between the terminal and the access point located within the restricted radio communication range, so as to set the encryption key.

The device for connecting with the wireless LAN is attached to the terminal, in order to attain wireless communication between the terminal and the access point. The device for connecting with the wireless LAN may be a wireless LAN adapter or a wireless LAN card.

The encryption key setting system of the present invention sets the encryption key, which is used to encrypt radio communication data transmitted between the access point and the terminal. The encryption key is set through wireless transmission of encryption key data representing the encryption key between the terminal and the access point, while the radio communication range between the access point and the terminal is restricted to be narrower than the general communication range. Even in the case of wireless communication of the encryption key data, the encryption key data is transmitted only in the narrower radio communication range about the access point. This arrangement makes it difficult to intercept the radio wave with the encryption key data carried thereon and effectively prevents leakage of the encryption key data. New enrollment of a terminal for the wireless LAN is thus attained by a simple procedure, while preventing leakage of the encryption key data. The encryption key setting system of the present invention thus allows for a user's friendly wireless LAN with a high security level.

The communication range restriction module may have any of various arrangements. For example, the access point may have the communication range restriction module. In one preferable application of the present invention, the encryption key setting system further includes: an instruction module that gives an instruction to start setting of the encryption key; and a condition specification module that specifies a condition of restricting the radio communication range to be narrower than the general communication range, based on the instruction given by the instruction module. In this application, the communication range restriction module restricts the radio communication range under the condition specified by the condition specification module. In response to the instruction given to start setting of the encryption key, the communication range restriction module restricts the radio communication range under a specified condition based on the instruction. The encryption key is then set in this restricted radio communication range. The access point is thus not required to be kept in the state of accepting the setting of the encryption key.

In another preferable application of the present invention, the communication range restriction module is disposed in the access point and carries out control to restrict the radio communication range to be narrower than the general communication range, while receiving an instruction of setting the encryption key from the terminal. On conclusion of setting the encryption key by the encryption key setting module, the communication range restriction module carries out control to restore the restricted radio communication range to the general communication range. This arrangement enables the user of the terminal to set the encryption key without touching the access point. In one preferable embodiment, the communication range restriction module regulates a transmission output of the access point to restrict the radio communication range.

In another preferable embodiment, the communication range restriction module has a shielding member to shield the terminal, in which the encryption key is set, and the access point from a radio signal. This arrangement effectively prevents the radio wave with the encryption key data carried thereon (hereafter referred to as encryption key radio wave) from being transmitted out of the shielding member, while preventing radio wave for intercepting the encryption key radio wave from entering the inside of the shielding member. This ensures sufficient prevention of leakage of the encryption key data to any third person.

The access point may have a registration module that registers unique information intrinsic to the terminal for communication. This arrangement allows only the terminal with the registered intrinsic information to gain access to the wireless LAN, while effectively preventing any unauthorized person from accessing the wireless LAN. This arrangement also prevents any unauthorized person from invading the terminal or the access point on the wireless LAN and illegally acquiring various data, such as the encryption key data.

The present invention is also directed to an access point that is a relay station for a wireless LAN and establishes wireless communication with a terminal equipped with a device for connecting with the wireless LAN. The access point encrypts radio communication data as an object of communication with a preset encryption key, prior to wireless communication with the terminal, and transmits the encrypted radio communication data to and from the terminal by wireless. The access point includes: a communication range restriction module that restricts a radio communication range between the access point and the terminal to be narrower than a general communication range; and an encryption key setting module that, while the radio communication range is restricted by the communication range restriction module, transmits encryption key data representing the encryption key by wireless to and from the terminal located in the restricted radio communication range, so as to set the encryption key.

The access point of the present invention transmits the encryption key, which is used to encrypt the radio communication data as the object of communication from and to the terminal, to the terminal by wireless and sets the transmitted encryption key in the terminal. The encryption key is set through wireless transmission of the encryption key data representing the encryption key between the terminal and the access point, while the radio communication range between the access point and the terminal is restricted to be narrower than the general communication range. Even in the case of wireless communication of the encryption key data, the encryption key data is transmitted only in the narrower radio communication range about the access point. This arrangement makes it difficult to intercept the radio wave with the encryption key data carried thereon and effectively prevents leakage of the encryption key data. New enrollment of a terminal for the wireless LAN is thus attained by a simple procedure, while preventing leakage of the encryption key data. The access point of the present invention thus allows for a user's friendly wireless LAN with a high security level.

The present invention is further directed to an encryption key setting method that sets an encryption key, which is used to encrypt radio communication data transmitted between an access point as a relay station for a wireless LAN and a terminal equipped with a device for connecting with the wireless LAN prior to the transmission, in the terminal. The encryption key setting method includes the steps of: (a) restricting a radio communication range between the access point and the terminal to be narrower than a general communication range; and (b) while the radio communication range is restricted in the step (a), transmitting encryption key data representing the encryption key by wireless between the terminal and the access point located within the restricted radio communication range, so as to set the encryption key.

The encryption key setting method of the present invention sets the encryption key, which is used to encrypt the radio communication data transmitted between the access point and the terminal. The encryption key is set through wireless transmission of encryption key data representing the encryption key between the terminal and the access point, while the radio communication range between the access point and the terminal is restricted to be narrower than the general communication range. Even in the case of wireless communication of the encryption key data, the encryption key data is transmitted only in the narrower radio communication range about the access point. This arrangement makes it difficult to intercept the radio wave with the encryption key data carried thereon and effectively prevents leakage of the encryption key data. New enrollment of a terminal for the wireless LAN is thus attained by a simple procedure, while preventing leakage of the encryption key data. The encryption key setting method of the present invention thus allows for a user's friendly wireless LAN with a high security level.

The present invention is also directed to an authentication code setting system that sets an authentication code, which is required when a terminal equipped with a device for connecting with a wireless LAN establishes wireless communication with an access point as a relay station for the wireless LAN to gain access to preset data on a network, in at least one of the terminal and the access point. The authentication code setting system includes: a communication range restriction module that restricts a radio communication range between the access point and the terminal to be narrower than a general communication range; and an authentication code setting module that, when the radio communication range is restricted by the communication range restriction module, transmits data representing the authentication code by wireless between the terminal and the access point located within the restricted radio communication range, so as to set the authentication code.

The authentication code may be individual information required for acquiring charged information from the access point, for example, the name, the ID, and the password of the user of the terminal.

The authentication code setting system of the present invention sets the authentication code in at least one of the terminal and the access point. The authentication code is required when the terminal establishes wireless communication with the access point to gain access to preset data on a network. The authentication code is set through wireless transmission of data representing the authentication code (hereafter referred to as authentication code data) between the terminal and the access point, when the radio communication range between the access point and the terminal is restricted to be narrower than the general communication range. Even in the case of wireless communication of the authentication code data, the authentication code data is transmitted only in the narrower radio communication range about the access point. This arrangement makes it difficult to intercept the radio wave with the authentication code data carried thereon and effectively prevents leakage of the authentication code data. Setting the authentication code of the terminal that utilizes the wireless LAN is thus attained by a simple procedure, while preventing leakage of the authentication code data. The authentication code setting system of the present invention thus enhances the security level of the wireless LAN.

The above and other objects, features, aspects, and advantages of the present invention will become more apparent from the following detailed description of the preferred embodiment with the accompanying drawings.

DESCRIPTION OF THE PREFERRED EMBODIMENTS

Some modes of carrying out the present invention are discussed below in the following sequence as preferred embodiments:

A. First Embodiment (Encryption Key Setting System LH1)
A-1. Outline of Encryption Key Setting System LH1
A-2. Series of Processing to Set WEP Key
A-3. Functions and Effects
B. Second Embodiment (Encryption Key Setting System LH2)
C. Modifications A. First Embodiment A-1. Outline of Encryption Key Setting System LH1

Figure 1:
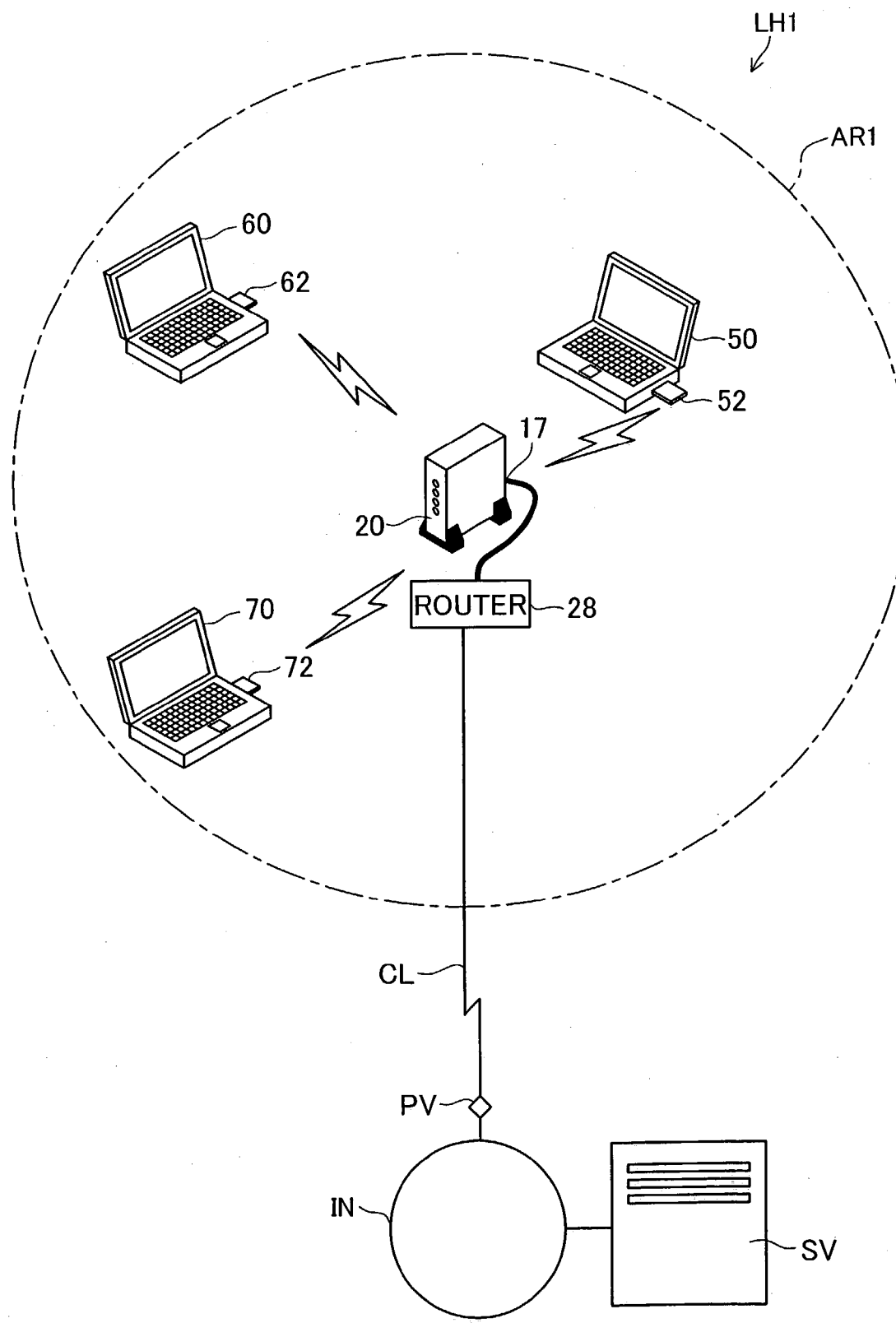
FIG. 1 shows the hardware structure of an encryption key setting system LH1 in a first embodiment of the present invention.
Figure 2:
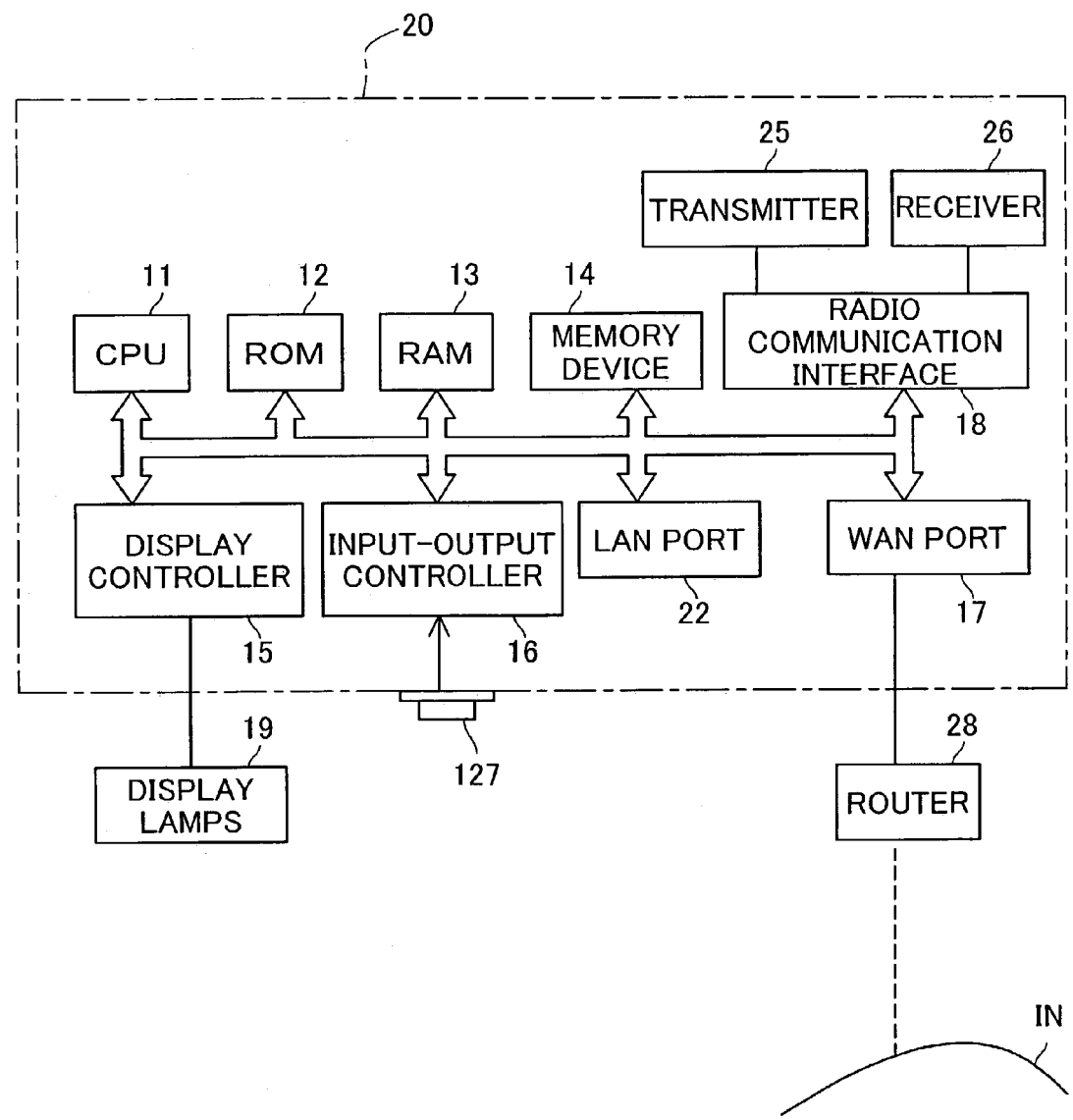
FIG. 2 shows the structure of an access point included in the encryption key setting system LH1.

FIG. 1 shows the hardware structure of an encryption key setting system LH1 in a first embodiment of the present invention. FIG. 2 shows the structure of an access point 20 included in the encryption key setting system LH1. The encryption key setting system LH1 sets a WEP key as an encryption key, which is used by the access point 20, in a terminal 50 through wireless communication of key data on the radio wave, which represents the WEP key, between the terminal 50 and the access point 20 in a radio communication area AR1 for a wireless LAN.

As shown in FIG. 1, the access point (radio base station) 20 as a relay station for a wireless LAN is located in the radio communication area AR2. The access point 20 has a CPU 11, as well as a ROM 12, a RAM 13, a non-volatile memory device 14, such as a hard disk, a WAN port 17 as a network interface, a LAN port 22 for connecting with a wired LAN, a radio communication interface 18, a display controller 15, and an input-output controller 16, which are mutually connected with the CPU 11 via a bus, as shown in FIG. 2.

The ROM 12 stores diverse programs relating to communication with terminals 50, 60, and 70 in the radio communication area AR1 and connection to the Internet IN, as well as data required for execution of these programs. A push-type registration button 127 is linked with the input-output controller 16. The registration button 127 has a pressing element exposed to the surface of the casing of the access point 20. The display controller 15 is linked with various display lamps 19 to show the connection status and the communication status of the wireless LAN by lighting or flashing on and off.

A transmitter 25 for transmitting radio waves and a receiver 26 for receiving radio waves are connected with the radio communication interface 18. The transmitter 25 and the receiver 26 are built in the access point 20 in-a radio-wave transmittable state to the outside and in a radio-wave receivable state from the outside, respectively. In the system of FIG. 1, the radio communication area AR1 represents the coverage of the radio wave transmitted from the transmitter 25 and of the radio wave transmitted from the terminal 50, 60, and 70 and received by the receiver 26, in the case where standard values are set to the output of the transmitter 25 and to the reception sensitivity of the receiver 26. Setting the access point 20 constructs a wireless LAN having the radio communication area AR1 as the general communication range.

An output changing program and a reception sensitivity changing program have been stored in advance as programs relating to communication with the terminal 50, 60, and 70 in the ROM 12. The output changing program describes a series of processing to temporarily change the standard setting value of the output of the transmitter 25. The reception sensitivity changing program describes a series of processing to temporarily change the standard setting value of the reception sensitivity of the receiver 26. The setting value is changed by an operation of multiplying the current standard setting value by 1/n (where n is a preset constant) The CPU 11 executes the output changing program and the reception sensitivity changing program and transfers the changed values of the output and the reception sensitivity to the transmitter 25 and the receiver 26 via the radio communication interface 18. This process accordingly changes the output of radio wave transmitted from the transmitter 25 and the reception density of radio wave in the receiver 26.

Each of the terminals 50, 60, and 70 is a known book-type personal computer and has a control unit including a CPU, a ROM, and a RAM and a storage unit, such as a hard disk and a CD-ROM drive. This is, however, not restrictive at all, and a personal digital assistant, a portable terminal, or any other equivalent device is applicable for each of the terminals 50, 60, and 70.

Wireless LAN adapters 52, 62, and 72 are respectively attached to the terminals 50, 60, and 70 as the device for connecting with the wireless LAN to allow transmission of radio wave to and from the access point 20. A device driver of each wireless LAN adapter 52, 62, or 72 is incorporated in the corresponding terminal 50, 60, or 70, so that the terminal 50, 60 or 70 can recognize the wireless LAN adapter 52, 62, or 72 attached thereto and control the attached wireless LAN adapter 52, 62, or 72. A MAC address as an intrinsic identification number is allocated to each of the wireless LAN adapters 52, 62, and 72.

The terminal 50, 60, or 70, which is a computer entering the radio communication area AR1, establishes wireless communication with the access point 20 via transmission of radio waves between the wireless LAN adapter 52, 62, or 72 attached to the terminal 50, 60, or 70 and the access point 20. The access point 20 and the wireless LAN adapter 52, 62, or 72 are capable of converting the data to be transmitted to a format suitable for communication, that is, packets. This theoretically allows for offline (in the state of no connection with the Internet) data transmission between the terminal 50, 60, or 70 and the access point 20.

The structure of connecting the access point 20 with the Internet IN is discussed below. As shown in FIG. 1, a router 28 with a built-in modem is linked with the WAN port 17 of the access point 20 via a cable. The router 28 identifies and discriminates each of the multiple terminals 50, 60, and 70 included in the wireless LAN from the other terminals, based on the MAC addresses respectively allocated to the wireless LAN adapters 52, 62, and 72.

The built-in modem of the router 28 is connected to the Internet IN via a broadband communication line CL, such as a CATV line or an xDSL line, and an exclusive line of a provider PV. The router 28 accordingly functions as a gateway to connect the wireless LAN with the Internet IN.

In this embodiment, the access point 20 allows a terminal having the MAC address registered in the access point 20 (hereafter referred to as registered terminal) to gain access to the wireless LAN, among the terminals with wireless LAN adapters possessed by the users in the radio communication area AR1. The user of the registered terminal connects the terminal to the Internet IN via the access point 20 to fetch diverse pieces of information, such as Web contents, stored in a server SV on the Internet IN. The access point 20, on the other hand, does not allow any terminal having the MAC address unregistered in the access point 20 (hereafter referred to as unregistered terminal) to gain access to the wireless LAN, even when the terminal enters the radio communication area AR1. Namely the radio communication area AR1 functions as a free spot that provides only the users of the registered terminals with the access service to the Internet IN. In the system of FIG. 1, the terminals 50 and 60 are registered terminals, whereas the terminal 70 is an unregistered terminal.

Data representing the details of various contracts, services, and the like (hereafter referred to as detailed data) are carried on the radio wave and are transmitted between the registered terminal and the access point 20. In the system of this embodiment, a transmitter device of transmitting the detailed data (either the registered terminal or the access point 20) encrypts the detailed data with an encryption key or a WEP key discussed previously, prior to the transmission, and transmits the encrypted detailed data (hereafter referred to as encrypted data) to a receiver device (either the access point 20 or the registered terminal) The receiver device decrypts the received encrypted data with the WEP key, so as to obtain the detailed data.

The WEP represents a secret key encryption method (this method uses an identical encryption key for encrypting data and for decrypting the encrypted data) in conformity with the IEEE 802.11 standard. The encryption key may be a 64-bit WEP key or a 128-bit WEP key.

Even when the radio wave with the detailed data carried thereon is intercepted in the radio communication area AR1, such encryption with the WEP key makes analysis of the detailed data difficult and thus effectively prevents leakage of the details of the communication to any third person. For example, in the case where a contract document including a credit card number is transmitted from a registered terminal to the access point 20, this arrangement effectively prevents the credit card number from being leaked to any third person through interception of the transmitted radio wave.

A-2. Series of Processing to Set WEP Key

The following describes a technique of setting the WEP key in the terminals 50 and 60.

A program of registering the MAC addresses of the wireless LAN adapters 52 and 62 (MAC registration program) has been stored in advance as a program relating to communication with the terminals 50 and 60 in the ROM 12 of the access point 20. A utility program of the wireless LAN installed in each of the terminals 50 and 60 includes a program of setting the WEP key (WEP key setting program).

Figure 3:
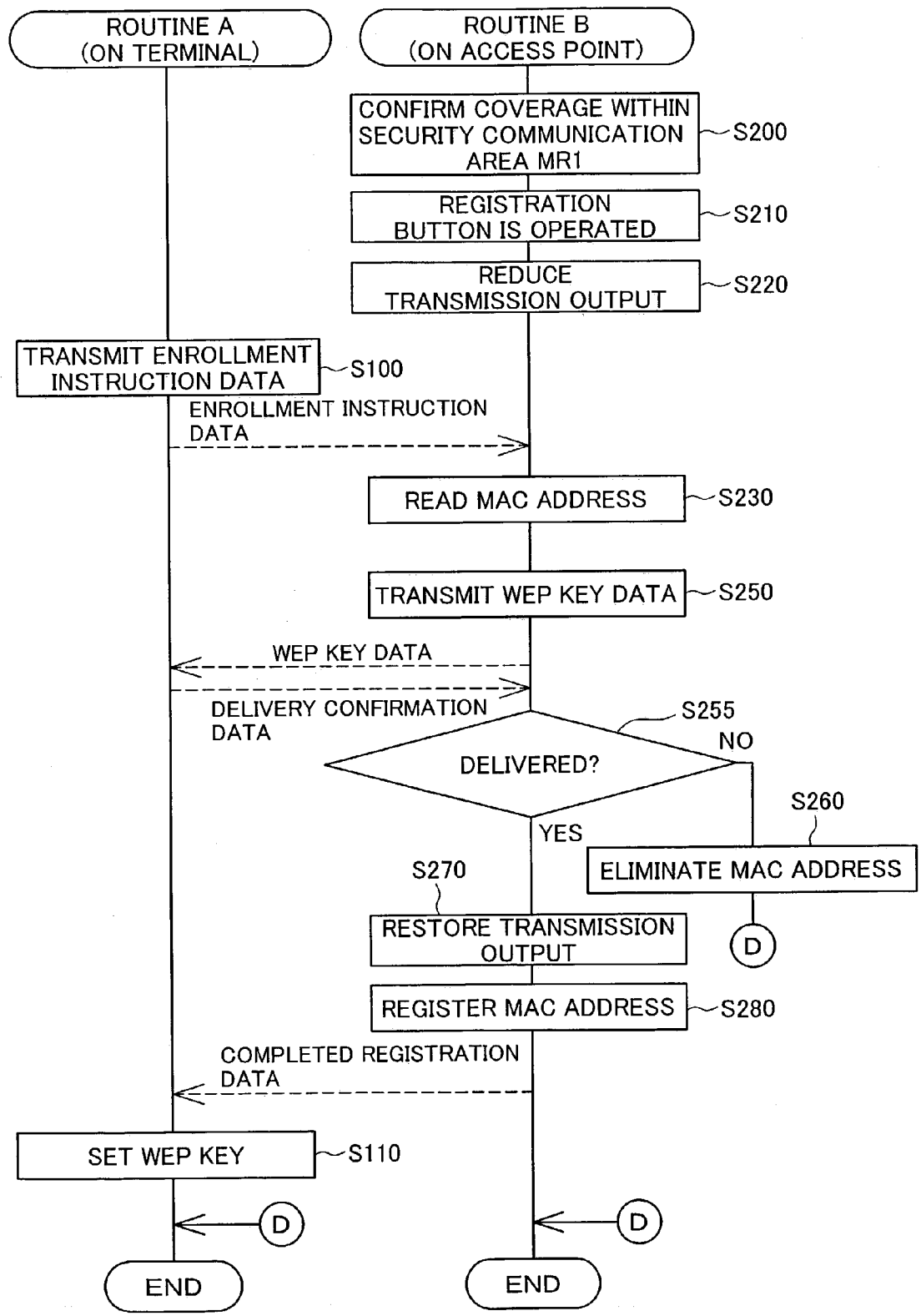
FIG. 3 is a flowchart showing a security data setting routine.

The CPU of the terminal 50 or 60 executes the WEP key setting program, while the CPU 11 of the access point 20 executes the MAC registration program and the output changing program, so as to implement a security data setting process shown in the flowchart of FIG. 3. The security data setting process registers the MAC addresses of the wireless LAN adapters 52 and 62 in the access point 20 and sets a common WEP key in the access point 20 and the terminal 50 or 60.

Figure 4:
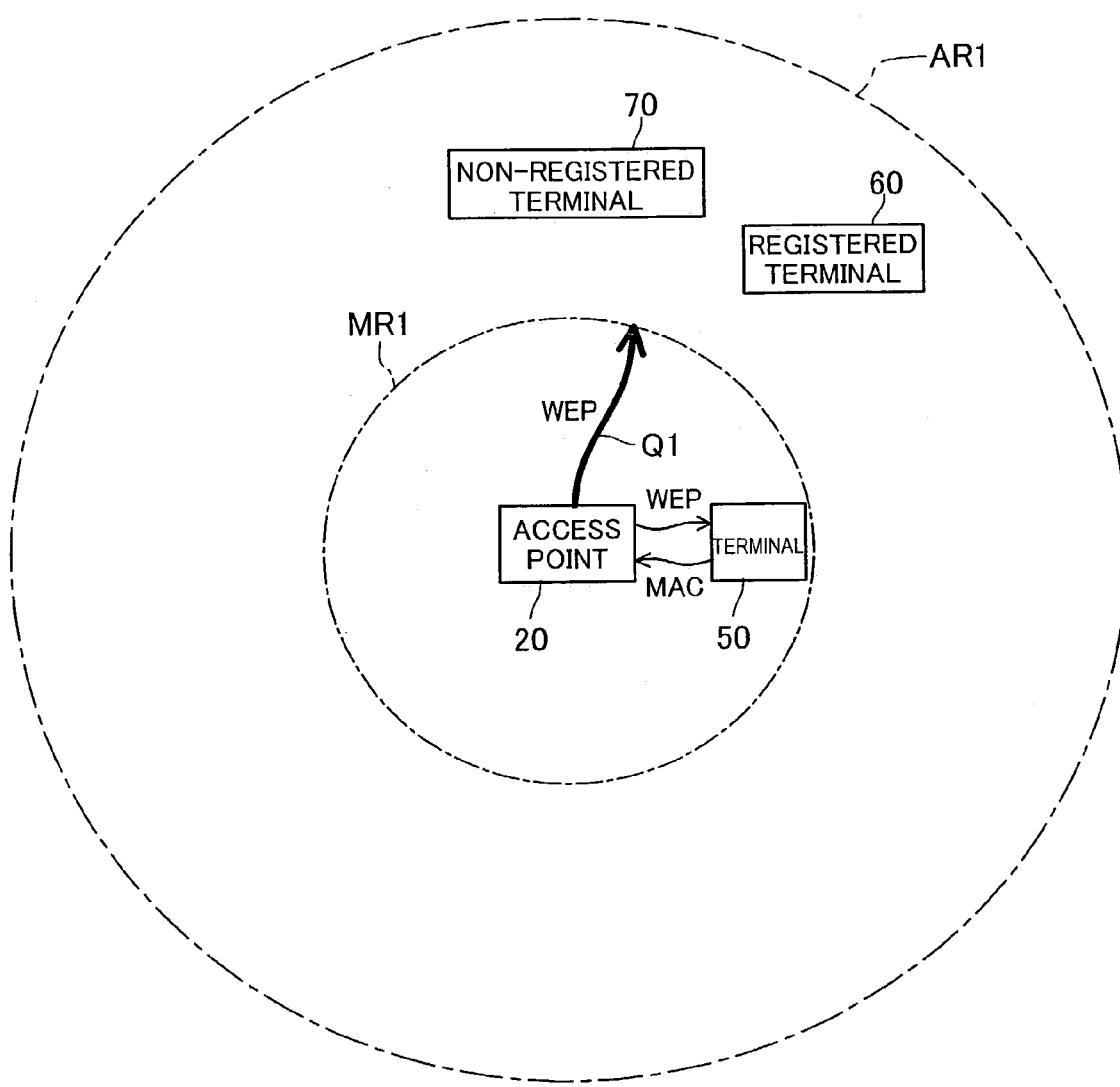
FIG. 4 shows a radio wave transmittable range of a transmitter after a change in output, as a security communication area MR1.

The security data setting process is discussed in detail with reference to FIGS. 3 and 4. FIG. 3 is a flowchart showing a security data setting routine. FIG. 4 shows a radio wave transmittable range of the transmitter 25 after a change in output, as a security communication area MR1. In the following description with FIGS. 3 and 4, it is assumed that the terminal 50 is the object of registration of the MAC address and the object of setting of the WEP key.

The security data setting routine includes a routine A executed by the CPU of the terminal 50 and a routine B executed by the CPU 11 of the access point 20. The administrator of the access point 20 confirms that the terminal 50 is located within the security communication area MR1 (step S200) and operates the registration button 127 (step S210). The security communication area MR1 represents a transmittable range of the radio wave from the transmitter 25, when the standard setting value is temporarily lowered by execution of the output changing program discussed previously (see FIG. 4). In response to the operation of the registration button 127, the access point 20 executes the output changing program and lowers the output of the transmitter 25 to 1/n of the standard setting value (step S220). This process restricts the radio wave transmittable range of the transmitter 25 to the security communication area MR1 shown in FIG. 4, which is narrower than the radio communication area AR1. The registered terminal that enters the radio communication area AR1 but is not located within the security communication area MR1 is thus not allowed to gain access to the access point 20.

The terminal 50 specifies the MAC address of the wireless LAN adapter 52 and transmits a packet, which includes data representing an instruction of new enrollment for the wireless LAN (hereafter referred to as enrollment instruction) and the MAC address attached to the data as header information, to the access point 20 (step S100).

The access point 20 reads the MAC address from the header information of the received packet and temporarily stores the MAC address into a buffer area of the RAM 13 (step S230).

The access point 20 subsequently transmits data representing a selected WEP key for use (hereafter referred to as WEP key data) to the terminal 50 (step S250), and determines whether or not the WEP key data has been delivered to the terminal 50 successively (step S255). The decision of successful delivery is carried out by utilizing a data return function of the wireless LAN adapter 52. In the case of failed delivery of the WEP key data to the terminal 50, the access point 20 eliminates the MAC address stored in the RAM 13 (step S260) and exits from the routine B.

In the case of successful delivery of the WEP key data to the terminal 50, on the other hand, the access point 20 executes the output changing program and restores the output of the transmitter 25 to the standard setting value (step S270). This process restores the radio wave transmittable range of the transmitter 25 to the general range (the radio communication area AR1). The registered terminal entering the radio communication area AR1 is thus allowed to gain access to the access point 20.

The access point 20 then registers the MAC address of the terminal 50 into a management region of the storage device 14 (step S280). This completes registration of the MAC address of the terminal 50 in the access point 20.

The terminal 50 receives the WEP key data delivered at step S250 and automatically sets the WEP key mapped to the IP address of the access point 20 (step S110). The terminal 50 then exits from the routine A. This completes setting of the WEP key mapped to the access point 20 in the terminal 50. After the registration of the MAC address and the setting of the WEP key, the detailed data are encrypted with the preset WEP key and the encrypted data are transmitted between the terminal 50 and the access point 20.

A-3. Functions and Effects

As discussed above, the encryption key setting system LH1 of the first embodiment executes the security data setting process, so as to automatically set the WEP key in the terminal 50. Such 'automatic setting of the WEP key through wireless communication' facilitates new enrollment of the terminal 50 for the wireless LAN, and thus allows for a user's friendly wireless LAN. Neither the user of the terminal 50 nor the administrator of the access point 20 is required to connect the terminal 50 with the access point 20 by cable or the like and to manually create and set the WEP key. The encryption key setting system LH1 is preferably applicable to a wireless LAN established in a free spot. A large number of new users successively enroll for the wireless LAN in the free spot. The arrangement of the embodiment significantly relieves the labor of the user and the administrator required for setting.

The access point 20 restricts the radio wave transmittable range from the access point 20 from the general radio communication area AR1 to the narrower security communication area MR1, in the course of transmitting the WEP key data on the radio wave to the terminal 50. This arrangement desirably lowers the possibility of interception of the radio wave with the WEP key data carried thereon. As shown in FIG. 4, when the WEP key data is transmitted from the access point 20 to the terminal 50, the radio wave with the WEP key data carried thereon does not go beyond the narrow security communication area MR1 (see an arrow Q1). The WEP key data is accordingly not received by the registered terminal 60 or the unregistered terminal 70 outside the security communication area MR1. This arrangement effectively prevents leakage of the WEP key data transmitted by wireless and thus ensures the high security level of the wireless LAN. The access point 20 is preferably installed in a free spot that is utilized by a large number of users. This effectively prevents the WEP key from being leaked to any third person in the course of setting the WEP key and ensures the sufficient secrecy of communication with regard to the large number of users.

In the encryption key setting system LH1 of the first embodiment, the access point 20 temporarily restricts the communication range in response to reception of the data representing an instruction of enrollment from the terminal 50 in the course of creating the WEP key and restores the communication range to the general range after transmission of the created WEP key to the terminal 50. The user of the terminal 50 can thus set the WEP key without touching the access point 20.

In the encryption key setting system LH1 of the first embodiment, the access point 20 registers the MAC address of the terminal 50 or 60, along with setting of the WEP key. The access point 20 then allows only the registered terminals 50 and 60 to gain access to the wireless LAN. This arrangement readily prevents the unregistered terminal 70 from accessing the wireless LAN and from invading the registered terminal 50 or 60 or the access point 20 on the wireless LAN to gain various data including the WEP key data.

In the system of the first embodiment, the communication range may be restricted, for example, (a) for a time period when the registration button 127 is being pressed, (b) for a time period from an operation of the registration button 127 to completion of registration of the MAC address and setting of the WEP key, or (c) for a time period from one operation of the registration button 127 to another operation of the registration button 127. The registration button 127 may not be used as the trigger for restricting the communication range. For example, the communication range may be restricted, when the access point 20 receives enrollment instruction data from the terminal 50. In this case, the response time of communication may be used to determine whether or not the terminal 50 is located within the security communication area MR1.

B. Second Embodiment (Encryption Key Setting System LH2)

The following describes another encryption key setting system LH2 as a second embodiment of the present invention. The system of the first embodiment adopts the software-based technique that temporarily restricts the communication range in the course of setting the WEP key, in order to prevent interception of the radio wave with the WEP key data carried thereon. The encryption key setting system LH2 of the second embodiment, on the other hand, adopts a hardware-based technique that uses a 'shielding box 95 covering over the access point 20 and the terminal 50', in order to prevent interception of the radio wave with the WEP key data carried thereon.

Figure 5:
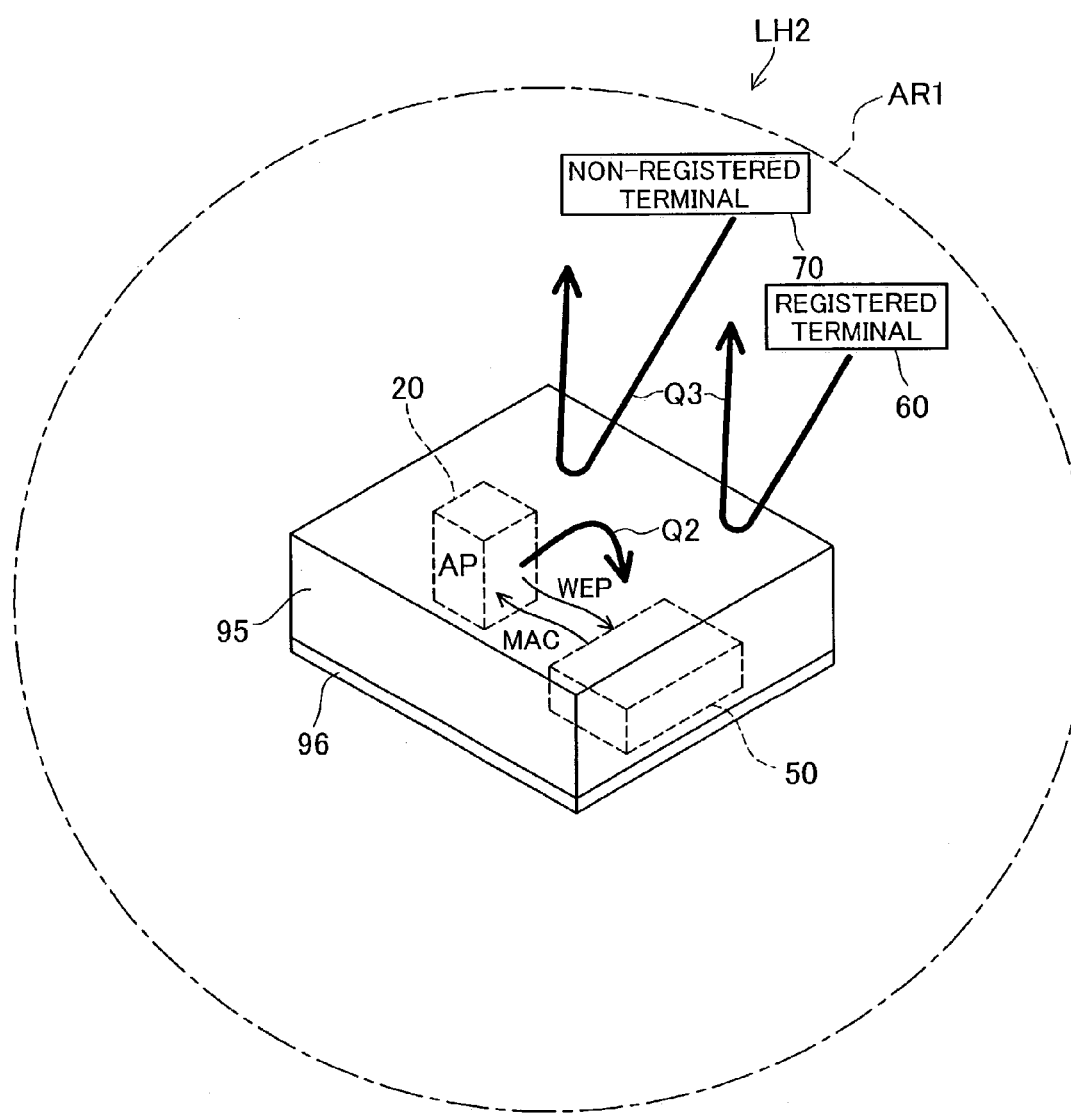
FIG. 5 shows the structure of another encryption key setting system HL2 in a second embodiment of the present invention.

FIG. 5 shows the structure of the encryption key setting system LH2 in the second embodiment of the present invention. The access point 20 and the terminals 50, 60, and 70 have substantially similar structures to those of the first embodiment. Like the first embodiment, there is the radio communication area AR1 around the access point 20. As shown in FIG. 6, in the system of the second embodiment, the access point 20 and the terminal 50 are located on a sole plate 96. The sole plate 96 is covered with a shielding box 95, which has a hollow space to accommodate the access point 20 and the terminal 50 therein. The shielding box 95 and the sole plate 96 are made of a metal, such as iron.

The system of the second embodiment sets the WEP key according to the following procedure. A user who desires to enroll for the wireless LAN goes to the place where the access point 20 is installed and locates the own terminal 50 and the access point 20 on the sole plate 96. The access point 20 may be located previously on the sole plate 96. The user subsequently operates the terminal 50 to give an enrollment instruction for the wireless LAN and covers the sole plate 96 with the shielding box 95. The access point 20 receives data representing the enrollment instruction from the terminal 50 and executes the process of registering the MAC address and the process of setting the WEP key (steps S100, S230 through S260, S280, and S110 in the flowchart of FIG. 3) after elapse of a preset time period (for example, a time required to cover the sole plate 96 with the shielding box 95) since the reception of the data. The MAC address of the terminal 50 is then registered in the access point 20. The WEP key data created by the access point 20 is transmitted to the terminal 50 and the WEP key is set in the terminal 50.

As discussed above, in the encryption key setting system LH2 of the second embodiment, the shielding box 95 shields the terminal 50 and the access point 20, between which the WEP key data is transmitted in the course of setting the WEP key. This arrangement effectively prevents interception of the radio wave with the WEP key data carried thereon. For example, as shown in FIG. 6, when the WEP key data is transmitted from the access point 20 to the terminal 50, the radio wave with the WEP key data carried thereon can not go through the shielding box 95 (see an arrow Q2). The WEP key data accordingly does not reach the registered terminal 60 or the unregistered terminal 70 in the radio communication area AR1. Even when the registered terminal 60 or the unregistered terminal 70 in the radio communication area AR1 tries to intercept the radio wave with the WEP key data carried thereon, the intercepting radio wave can not go through the shielding box 95 (see an arrow Q3). The registered terminal 60 or the unregistered terminal 70 accordingly does not catch the radio wave with the WEP key data carried thereon. This arrangement effectively prevents leakage of the WEP key data transmitted by wireless and thus ensures the high security level of the wireless LAN.

C. Modifications

The embodiment discussed above is to be considered in all aspects as illustrative and not restrictive. There may be many modifications, changes, and alterations without departing from the scope or spirit of the main characteristics of the present invention.

In one possible modification of the above system, an external antenna may be linked with the access point 20 by cable, and registration of the MAC address and setting of the WEP key may be carried out through wireless communication between the external antenna and the terminal 50. This arrangement desirably enhances the degree of freedom in the installation site of the access point 20. For example, an external antenna is located at one corner of a shop, and the periphery of the external antenna is specified as a location of setting the WEP key. The access point 20 is installed in a central area of the shop to have the radio communication area covering the whole shop.

The system of the above embodiment uses the WEP as the technique of encrypting the details of the data transmitted between the terminal and the access point. Any suitable encryption technique other than the WEP, for example, public key cryptosystem (different encryption keys are used for encryption of data and for decryption of encrypted data) may be applied for the same purpose. The WPA (Wi-Fi Protected Access) encryption technique having the higher strength than the WEP is also applicable.

In the system of the above embodiment, the radio communication range is restricted in the course of setting the WEP key. Such restriction of the radio communication range is applicable for not only the WEP key but another piece of information set through data transmission between the access point 20 and the terminal 50. In a free spot that transmits a charged content to only specified users, information for authenticating the user of each terminal accessing to the free spot (for example, the name, the ID, and the password of the user of the terminal) may be registered in advance in the access point 20 and the terminal 50. Registration of such individual authentication information may be carried out through wireless communication, while the radio communication range between the access point 20 and the terminal 50 is restricted. This arrangement does not require the user to manually set the individual authentication information, such as the ID and the password.

What is claimed is:

1. An encryption key setting system that sets an encryption key, which is used to encrypt radio communication data transmitted between an access point and a relay station for a wireless LAN and a terminal equipped with a device for connecting with the wireless LAN prior to the transmission, in said terminal, said encryption key setting system comprising:
    an instruction module provided at said access point that gives instructions to start setting said encryption key;
    a communication range restriction module that restricts a radio communication range between said access point and said terminal to be narrower than a general communication range; and
    an encryption key setting module that, while the radio communication range is restricted by said communication range restriction module, transmits encryption key data representing the encryption key by wireless between said terminal and said access point located within the restricted radio communication range, so as to facilitate setting said encryption key at said terminal.

2. An encryption key setting system in accordance with claim 1, said encryption key setting system further comprising;
    a condition specification module that specifies a condition of restricting the radio communication range to be narrower than the general communication range, based on the instructions given by said instruction module,
    wherein said communication range restriction module restricts the radio communication range under the condition specified by said condition specification module.

3. An encryption key setting system in accordance with claim 1, wherein said communication range restriction module is disposed in said access point and carries out control to restrict the radio communication range to be narrower than the general communication range, when receiving an instruction of setting the encryption key from said terminal, and
    said communication range restriction module, on conclusion of setting the encryption key by said encryption key setting module, carries out control to restore the restricted radio communication range to the general communication range.

4. An encryption key setting system in accordance with claim 1, wherein said communication range restriction module regulates a transmission output of said access point to restrict the radio communication range.

5. An encryption key setting system in accordance with claim 1, wherein said communication range restriction module comprises a shielding member to shield said terminal, in which the encryption key is set, and said access point from a radio signal.

6. An encryption key setting system in accordance with claim 1, wherein said access point comprises a registration module tat registers unique information intrinsic to said terminal for communication.

7. An access point that is a relay station for a wireless LAN and establishes wireless communication with a terminal equipped with a device for connecting with the wireless LAN, said access point encrypting radio communication data as an object of communication with a preset encryption key, prior to wireless communication with said terminal, and transmitting the encrypted radio communication data to and from said terminal by wireless, said access point comprising:
    an instruction module that gives instructions to start setting said encryption key;
    a communication range restriction module that restricts a radio communication range between said access point and said terminal to be narrower than a general communication range; and
    an encryption key setting module that, while the radio communication range is restricted by said communication range restriction module, transmits encryption key data representing the encryption key by wireless to and from said terminal located in the restricted radio communication range, so as to facilitate setting said encryption key at said terminal.

8. An encryption key setting method that sets an encryption key, which is used to encrypt radio communication data transmitted between an access point as a relay station for a wireless LAN and a terminal equipped with a device for connecting with the wireless LAN prior to the transmission, in said terminal, said encryption key setting method comprising the steps of:
    (a) giving instructions to start setting said encryption key;
    (b) restricting a radio communication range between said access point and said terminal to be narrower than a general communication range; and
    (c) while the radio communication range is restricted in said step (b), transmitting encryption key data representing the encryption key by wireless between said terminal and said access point located within the restricted radio communication range, so as to facilitate setting said encryption key at said terminal.

9. An authentication code setting system that sets an authentication code, which is required when a terminal equipped with a device for connecting with a wireless LAN establishes wireless communication with an access point as a relay station for the wireless LAN to gain access to preset data on a network, in at least one of said terminal and said access point, said authentication code setting system comprising:
    an instruction module provided at said access point that gives instructions to start setting said authentication code;
    a communication range restriction module that restricts a radio communication range between said access point and said terminal to be narrower than a general communication range; and
    an authentication code setting module that, while the radio communication range is restricted by said communication range restriction module, transmits data representing the authentication code by wireless between said terminal and said access point located within the restricted radio communication range, so as to facilitate setting said authentication code at said terminal.

* * * * *